United States Patent [19]
Inoue

[11] Patent Number: 5,978,555
[45] Date of Patent: Nov. 2, 1999

[54] COLOR IMAGE RECORDING APPARATUS

[75] Inventor: Katsushi Inoue, Kanagawa, Japan

[73] Assignee: Fuji Photo Film Co., Ltd., Kanagawa, Japan

[21] Appl. No.: 08/965,418

[22] Filed: Nov. 6, 1997

[30] Foreign Application Priority Data

Nov. 7, 1996 [JP] Japan .................................. 8-294925

[51] Int. Cl.$^6$ .............................. H04N 1/46; G06F 15/00
[52] U.S. Cl. .......................... 395/109; 358/501; 358/526; 358/296
[58] Field of Search ............................ 395/109; 382/162, 382/167; 358/401, 501, 504, 526, 530, 296; 355/55, 88, 99

[56] References Cited

U.S. PATENT DOCUMENTS 3,995,958  12/1976  Pfahl .......................................  356/173
5,706,046   1/1998  Eki ............................................  347/252

*Primary Examiner*—Jerome Grant, II

*Attorney, Agent, or Firm*—Sughrue, Mion, Zinn, Macpeak & Seas, PLLC

[57] ABSTRACT

The improved color image recording apparatus comprises a raster image processor to create scan image data; a color management system to correct the color/density of the scan image data; an exposing device with which a photosensitive material is scan exposed by multi-channel exposure to record a latent image in accordance with the corrected scan image data; a developing device with which the photosensitive material having the latent image formed thereon is subjected to a development process so as to create a hard copy having the image reproduced thereon; an instrument to measure the color/density of the image in the hard copy; and a system for revising the conditions of exposure in the exposing device and/or the conditions of correction in the color management system in accordance with the result of measurement with the instrument. This color image recording apparatus ensures that hard copies having print-quality images and a high degree of similarity to the actual print can be output consistently with satisfactory color stabilization and reproduction. Further, the apparatus is capable of outputting hard copies of large sizes up to A1 at high speed with high efficiency.

16 Claims, 3 Drawing Sheets

COLOR IMAGE RECORDING APPARATUS

BACKGROUND OF THE INVENTION

This invention relates to the technical field of color image recording apparatus, more particularly, those which are used with advantage in the creation of (color) proofs in the printing field.

With the recent advances in digital technology, it is expected in the printing industry that the technology is utilized to verify the quality of copy at an early stage of the process starting with its input and ending with the printing (outputting) of the final copy so that the number of required corrections is reduced to achieve higher productivity. The quality verification employs a hard copy called "proof" or "color proof" which has the same image recorded as in the actual print. Hence, the proof is required to have a high degree of similarity to the actual print (of final copy) in terms of not only graphics pattern but also color and/or density.

The proofs are typically created by color image recording apparatus (color proofing apparatus) employing various techniques such as electrophotography, thermal transfer by sublimation, thermal transfer by fusion and ink jet printing. However, the conventional color proofing apparatus employing these methods are not completely satisfactory in performance for the following reasons and need substantial improvements.

Most of the color proofs for printing are of A4 or A3 size but larger sizes A2 and A1 are also available. With the conventional color proofing apparatus, the speed of creating larger proofs is quite slow, i.e. about 20 minutes with the A2 size and as long as about 40 minutes with the A1 size, which means very low efficiency.

As already mentioned, the color proof is required to have a degree of high similarity to the actual print and the color proofing apparatus must be capable of outputting a print-quality color proof with satisfactory color reproduction in a consistent manner.

Therefore, the image quality of the color proof is required to be comparable to that of the final print in various aspects including color/density resolution, image gradation and granularity. However, it is difficult for the conventional color proofing apparatus to meet all of these requirements and yet ensure high productivity. It goes without saying that neither color proofing apparatus which satisfy more rigorous requirements such as similarity in color to the actual print and consistent color reproduction nor a technology that can put the apparatus into commercial use have yet been realized.

SUMMARY OF THE INVENTION

The present invention has been accomplished under these circumstances and has as an object providing a color image recording apparatus capable of fast, efficient and consistent outputting of color proofs that not only have good image quality but also ensure a high degree of similarity to the actual print.

The stated object of the invention can be attained by a color image recording apparatus with which one page of image created by assignment of at least one of graphics, characters and line drawings is reproduced in hard copy using a photosensitive material, which apparatus comprises;

a raster image processor with which said image described in a computer language is expressed in bit maps to create scan image data;

color management means by which the color/density of the scan image data generated with said raster image processor are corrected in accordance with the conditions for the reproduction of said image by the user of said hard copy;

an exposing device with which the photosensitive material is scan exposed by multi-channel exposure to record a latent image in accordance with the scan image data corrected by said color management means;

a developing device with which the photosensitive material having the latent image formed thereon by said exposing device is subjected to a development process so as to create a hard copy having said image reproduced thereon;

an instrument which is provided in said developing device to measure the color/density of the image in said hard copy; and means for revising the conditions of exposure in said exposing device and/or the conditions of correction in said color management means in accordance with the result of measurement with said instrument.

Preferably, said photosensitive material is a silver halide photosensitive material which requires thermal development and brought into a superposed relationship with an image-receiving material such that an image is transferred on to said image-receiving material to produce a hard copy which has said image reproduced thereon.

It is preferred that the computer language is a page description language and that the color management means is a lookup table.

Preferably, the exposing device comprises an exposing drum holding the photosensitive material on its outer circumference and being rotated to perform main scanning, an exposing unit issuing a plurality of light beams to the photosensitive material wound onto the outer circumference of the exposing drum to perform the multi-channel exposure of the photosensitive material, a carriage moving the exposing unit in a direction parallel to a rotating axis of the exposing drum to perform auxiliary scanning, means for rotating the exposing drum, and means for holding and securing the photosensitive material on the outer circumference of the exposing drum by suction.

Preferably, the exposing unit comprises a light source assembly containing three light sources which issue three recording lights for recording a color image on the photosensitive material, shaping optics shaping the three recording lights issuing from the three light sources into generally parallel recording lights spread laterally, an optical modulator yielding a plurality of independent beams of each of the three recording lights as modulated independently, and imaging optics focusing a plurality of modulated independent beams of each of the three recording lights on the photosensitive material held on the outer circumference of the exposing drum.

Preferably, the optical modulator is a spatial modulating device which turns on and off the plurality of independent beams of each of the three recording lights in accordance with the scan image data sent from the color management means, thereby effecting pulse-width modulation or pulse-numbers modulation.

Preferably, the optical modulator comprises a polarizer being common to the three recording lights and provided on the side of the light source assembly, an analyzer being common to the three recording lights and provided on the side of the photosensitive material, and a modulating plate provided between the polarizer and the analyzer and having three liquid-crystal cell arrays formed in accordance with the three recording lights, respectively.

Preferably, each of the three liquid-crystal cell arrays is an array of multiple liquid-crystal cells comprising a liquid-crystal layer sealed between transparent electrodes and the respective liquid-crystal cells are controlled independently of one another by each electrode pair.

A liquid crystal used in the liquid-crystal cells is preferably a ferroelectric liquid crystal, more preferably a smectic A liquid crystal.

It is preferred that the optical modulator is a liquid-crystal shutter array to achieve pulse-width or pulse-numbers or pulse-amplitude modulation and that the optical modulator has temperature adjusting means for keeping temperature within a specified range.

The temperature adjusting means preferably keeps the temperature within an error range of ±1° C.

Preferably, the color image recording apparatus further comprises a buffer unit provided for temporary storage of the photosensitive material between the exposing device and the developing device so that the exposing device can be operated independently of the developing device.

Preferably, patches of different densities including colors and gray are formed outside of an image region for the hard copy as well as the image is reproduced in the image region, and the color/densities of the patches are measured by the instrument to revise the conditions of exposure in the exposing device and/or the conditions of correction in the color managing means by means of the revising means.

DETAILED DESCRIPTION OF THE INVENTION

The color image recording apparatus of the invention will now be described in detail with reference to the accompanying drawings.

Figure 1:
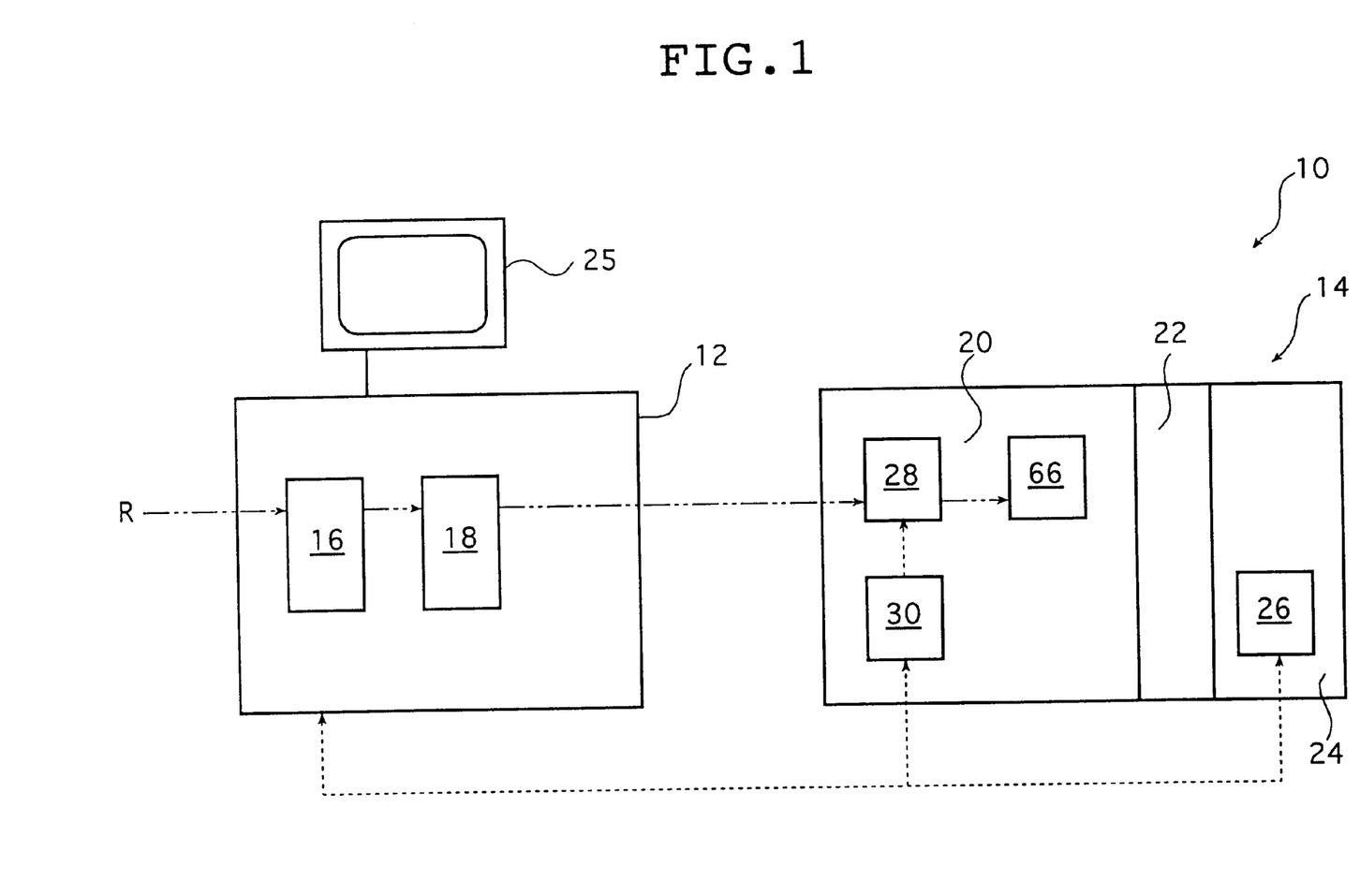
FIG. 1 shows the concept of an embodiment of the color image recording apparatus of the invention.

FIG. 1 shows the concept of an embodiment of the color image recording apparatus of the invention. The color image recording apparatus generally indicated by 10 in FIG. 1 (which is hereunder referred to simply as "recording apparatus 10") is capable of outputting hard copies of sizes up to A1 and comprises two basic components: a control unit 12 having a raster image processor (hereunder RIP) 16 and a color management system (hereunder CMS) 18, and a printer 14 which is an integral assembly of an exposing device 20, a buffer unit 22 and a developing device 24.

The control unit 12 performs various functions including the management of the overall operations of the recording apparatus 10, its control and keyboarding and is typically composed of a computer or a workstation. Indicated by 25 in FIG. 1 is a display on which to manipulate the recording apparatus 10 by GUI (Graphic User Interface), as well as to display the image and various kinds of information, etc. which are supplied from a source R such as an editing workstation.

As already mentioned, the recording apparatus 10 has RIP 16 and CMS 18 incorporated in the control unit 12.

The recording apparatus 10 reproduces in hard copy one page of image constructed by at least one assignment of graphics, characters and line drawings and it is used with advantage for creating color proofs in the printing field.

As is well known in the printing field, characters, line drawings and graphics or pictures that are read with a scanner are edited or comped with an editing workstation or a layout (comping) unit, color corrected and determined for the species of line drawings and characters so as to construct one page of image.

One page of the edited image has various kinds of information described in a computer language (PDL: Page Description Language) depending on the type of the image; if it is graphics in photo or print, the information of its position and color/density information on yellow (Y), magenta (M), cyan (C) and black (K) are described; if the image is characters, the information of their position, the font type and size are described; if the image is line drawings, their type, position information and color/density information are described; hence, no data is available for the image to be scanned which corresponds to image recording with printers and the like.

The RPI 16 receives PDL data from the source R such as an editing workstation or a layout unit and the image described with the PDL data is expressed in bit maps by a known technique to construct scan image data which corresponds to image recording by optical scanning. In other words, the PDL data is translated into density data on C, M, Y and even K (or red R, green G and blue B) for each pixel in one page of image.

The PDL that can be used in the recording apparatus 10 of the invention is not limited in any particular way and various known languages (formats) may be employed such as PostScript and EPS (Encapsulated Postscript) of Adobe Systems.

The RIP 16 may optionally have a capacity for output job management, as well as the capability of simulating moire in the print to be finally obtained.

The scan image data generated (converted) in the RIP 16 is then corrected by the CMS 18.

As already mentioned, it is required in the printing field that the quality of prints should be verified at an early stage of the process starting with the inputting of copy and ending with the printing of the final copy so that the number of required corrections is reduced. In other words, it is important that the aesthetic appearance of the final print be predictable in the more upstream step of the whole printing process. To meet this need, proofs are created and their quality is verified. Therefore, the proofs are required to have a high degree of similarity to the actual prints.

In fact, however, the color/density of the image reproduced on the print vary with the printing conditions such as the printer, paper and ink that are used and this makes it difficult for the conventional color proofing apparatus to output print-quality proofs in a consistent manner.

The CMS 18 corrects the scan image data such that given the same scan image data (PDL data), the recording apparatus 10 (printer 14) will output a hard copy (proof) which is identical to the actual print; in other words, the CMS 18 may well be considered as a profile which performs inter-device color management. Having the CMS 18, the recording apparatus 10 can realize a high degree of similarity between a hard copy it outputs and the print output by the user.

In the illustrated case, the CMS 18 may be a lookup table (LUT) by which the scan image data generated in the RIP 16 is corrected in accordance with the user-dependent printing conditions such as the printer, paper and ink such that the hard copy output by the recording apparatus 10 is identical to the actual print at the user end.

In the illustrated case, the CMS 18 is installed independently of the RIP 16 but, if desired, depending on the configuration, performance and other parameters of the RIP 16 and the control unit 12, the CMS 18 may be built in the RIP 16.

The method of constructing a LUT which is to be set in the CMS 18 is not limited in any particular way and various known methods may be employed. In one example, a hard copy to be output from the printer 14 and a print associated with the printing conditions to be employed by the user are produced from the same scan image data (e.g., image data on a chart having various chromatic and achromatic patches formed thereon) and the two images are subjected to colorimetry; the LUT to be constructed is such that on the basis of the results of measurement, algorithm calculations and any other suitable techniques are performed to correct the scan image data to the printer 14 so as to ensure that the two images obtained from the same scan image data are identical to each other.

In the recording apparatus 10 of the invention, the CMS 18 may be adapted to be such that in accordance with the printing conditions such as the combination of paper and ink which the user actually employs (or the user may potentially employ), multiple LUTs are preliminarily constructed and stored in the internal memory of the control unit 12 and when the printing conditions change, a relevant LUT is downloaded into the CMS 18 by an operator's instruction. Alternatively, the CMS 18 may be adapted to be such that a preliminarily constructed LUT is stored in an external storage medium such as a floppy disk and downloaded into the CMS 18 when the printing conditions change.

Another LUT that may be set as the CMS 18 is such that when the printing conditions have changed, it outputs the actual print and corrects the scan image data in accordance with the quality of that print.

On some occasions, the CMS 18 using the correction LUT may not suffice to ensure the intended match between the actual print and the hard copy output from the printer 14. In that case, "customization" to satisfy a specific user of the recording apparatus 10 is preferably performed on the basis of the actually output print and the scan image data with which it was recorded; three typical methods of customization are rewriting the LUT in the CMS 18, adjusting the conditions of exposure and development to be performed in the printer 24 which is to be described later, and adding correction means other than the CMS 18. These are effective in enhancing the similarity between the actual print and the hard copy output from the recording apparatus 10.

The scan image data corrected by the CMS 18 is sent to the exposing device 20 in the printer 14 and subjected to an image recording process. In order to enable rapid hard copy output, the scan image data is preferably transferred from the control unit 12 to the printer 14 as fast as possible and an interface capable of high-speed data transfer is preferably employed. Specifically, an interface such as WIDE SCSI having a transfer bus width of 16 bits or more may be used with advantage.

The printer 14 comprises the exposing device 20 which exposes a photosensitive material A in accordance with the scan image data sent from the CMS 18, a developing device 24 which develops the exposed photosensitive material A to output a hard copy and a buffer unit 22 which links the exposing device 20 to the developing device 24.

The illustrated printer 14 (recording apparatus 10) employs a color silver halide photosensitive material which is capable of producing images of better quality in such terms as gradation, resolution and color reproduction than the image recording methods conventionally employed in the creation of proofs such as electrophotography, thermal transfer by sublimation, thermal transfer by fusion and ink jet printing. In the illustrated case, a thermally processable material is used as the photosensitive material A; this is a silver halide photosensitive material which involves a thermal developing step and which produces a hard copy by transferring the image on to an image-receiving material C having an image-receiving layer (dye fixing layer) in the presence of an image forming solvent. The photosensitive material A having this feature is commonly referred to as a "pictrographic" photosensitive material and available from Fuji Photo Film Co., Ltd.

In the printer 14, the photosensitive material A is exposed by means of the exposing device 20, passes through the buffer unit 22 to be sent to the developing device 24, where it is wetted with water as an image forming solvent, brought into a superposed relationship with an image-receiving material C, subjected to thermal development and has the developed image transferred on to the image-receiving material C, which is separated from the photosensitive material A to produce a hard copy carrying a reproduced image of the PDL data supplied from the source R.

Figure 2:
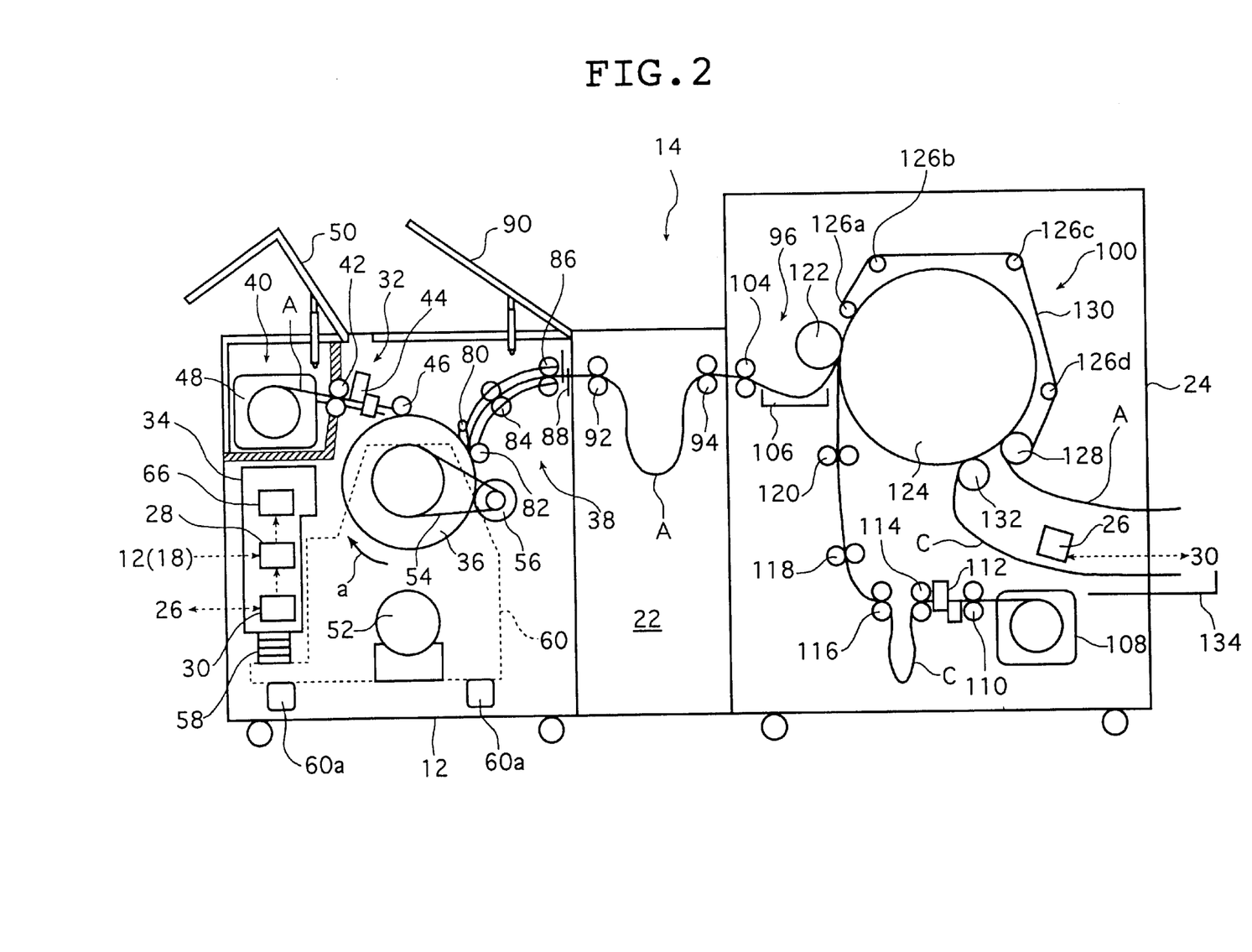
FIG. 2 shows schematically an embodiment of a printer in the color image recording apparatus of FIG. 1.

FIG. 2 is a schematic representation of the printer 14. As shown, the exposing device 20 of the printer 14 comprises basically a supply section 32, an exposing unit 34, an exposing drum 36 and an ejecting section 38 and it is capable of performing high-speed exposure by multi-channel exposure, in which the photosensitive material A is exposed to a plurality of recording light beams simultaneously.

The supply section 32 comprises a magazine loading area 40, a withdrawing roller pair 42, a cutter 44 and a guide roller 46, as well as an optional transport guide, with these components being arranged in the direction of transport of the photosensitive material A (from the upstream to downstream end).

In the illustrated apparatus, the photosensitive material A is wound in a roll with the photosensitive surface facing outward; the roll is contained in a light-shielding casing to provide a magazine 48, which is loaded into the magazine loading area 40 with its cover 50 opened.

The photosensitive material A is drawn out of the magazine 48 by means of the withdrawing roller pair 42 and guided by the roller 46 in contact with the exposing drum 36 such that it is wound onto the drum 36 with the photosensitive surface facing up as the drum revolves in the direction of arrow a. When the photosensitive material A has been withdrawn by a specified length, the drawing of the photosensitive material A out of the magazine 48 and its winding onto the drum 36 are ceased and the cutter 44 cuts the photosensitive material A to a specified length, for example, a length comparable to size A2 if it is the size of the hard copy to be created.

The photosensitive material A is aspirated by a vacuum pump 52 to be held and secured on the exposing drum 36.

The exposing drum 36 is a cylinder having such a diameter and length (height) that a sheeting of size A1 can be wound onto the outer circumference of the drum in its longitudinal direction. Main scanning of the exposing drum 36 is performed by rotating it at high speed in the direction of arrow a, with the photosensitive material A of a specified length being wound onto its outer circumference. The exposing drum 36 is rotated by means of an endless belt 54 and a motor 56.

Figure 3:
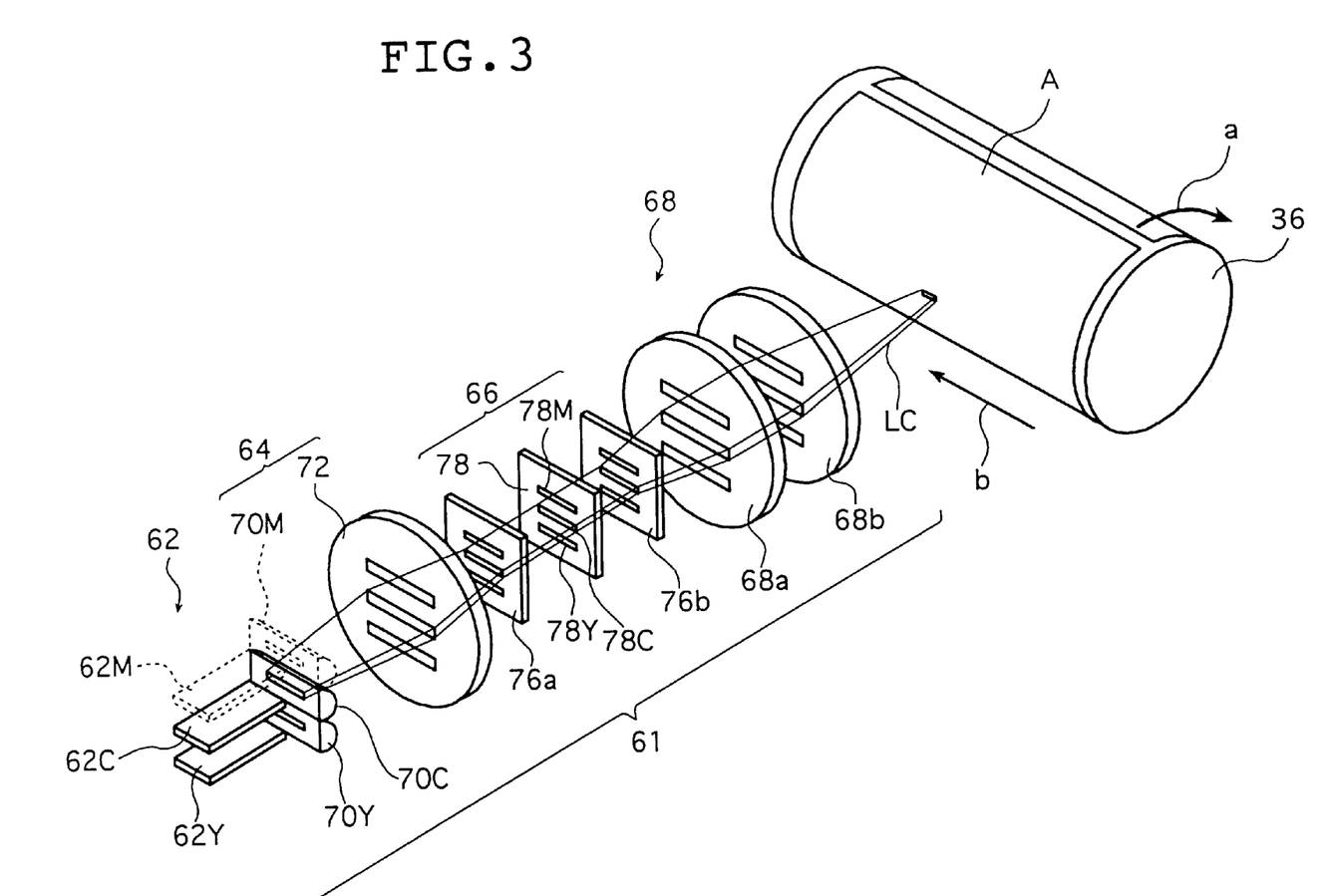
FIG. 3 is a perspective view showing schematically an embodiment of an exposing optics and an exposing drum in the color image recording apparatus of FIG. 1.

In the illustrated exposing device 10, the exposing drum 36 holding the photosensitive material A is rotated to perform main scanning while, at the same time, a carriage 58 moves the exposing unit 34 in a direction perpendicular to the rotation of the exposing drum 36 (i.e., parallel to the rotating axis of the exposing drum 36, or normal to the plane of paper of FIG. 2, or in the direction of arrow b in FIG. 3) so as to perform auxiliary scanning; as a result, the photosensitive material A is subjected to two-dimensional scan exposure to the multiple channels of recording light issued from the exposing unit 34, thereby effecting blanket image recording.

The exposing unit 34 (carriage 58), exposing drum 36, motor 56 and vacuum pump 52 are retained on a bracket 60 indicated by the dashed line in FIG. 2. The bracket 60 is secured in the housing of the exposing device 20 via anti-vibration rubber elements 60a.

FIG. 3 is a perspective view showing schematically optics 61 and exposing drum 36 in the exposing unit 34. As shown, the exposing unit 34 has optics 61 comprising a light source assembly 62, shaping optics 64, an optical modulator 66 and imaging optics 68 and as the exposing drum 36 carrying the photosensitive material A is rotated in the direction of arrow a, the photosensitive material A is illuminated with recording light $L_M$, $L_C$ and $L_Y$ which have been modulated with the optical modulator 66 (for the sake of simplicity, only the recording light $L_C$ is shown in FIG. 3) while, at the same time, the exposing unit 34 is moved in the direction of arrow b, whereby the photosensitive material A is scanned two-dimensionally with the recording light $L_M$, $L_C$ and $L_Y$ to effect imagewise exposure.

The light source assembly 62 contains three light sources 62M, 62C and 62Y which issue the three recording lights $L_M$, $L_C$ and $L_Y$ for recording a color image on the photosensitive material A. In the illustrated case, the light sources 62M, 62C and 62Y are laser diodes (LD) which issue recording light $L_M$, $L_C$ and $L_Y$ at wavelengths in narrow bands that are commensurate with the spectral sensitivity characteristics of the photosensitive material A.

The exposing light sources that can be used in the invention are in no way limited to these LDs and any other light sources may be employed as long as they can issue recording light L at narrow-band wavelengths which can produce color on the photosensitive material A; such alternative light sources include a semiconductor laser, a LED, a gas laser and a wavelength converted laser using a SHG device.

The shaping optics 64 is such that the recording light $L_M$, $L_C$ and $L_Y$ issued from the light sources 62M, 62C and 62Y are shaped into generally parallel recording light spread laterally (in the direction of arrow b) which is capable of illuminating the entire surfaces of all liquid-crystal cells in the optical modulator 66 (to be described below) in the right amount, preferably in a uniform quantity. To this end, the shaping optics 64 has cylindrical lenses 70M, 70C and 70Y which act on the respective recording lights $L_M$, $L_C$ and $L_Y$ to shape them into beams of a uniform quantity which are spread laterally (in the direction of arrow b), as well as a convex lens 72 which acts on the collimated recording light $L_M$, $L_C$ and $L_Y$ simultaneously to make them convergent.

The optical modulator 66 is a spatial modulating device which turns on (transmits) and off (blocks) the recording light $L_M$, $L_C$ and $L_Y$ in accordance with the scan image data sent from the CMS 18, thereby effecting pulse-width (or pulse-numbers) modulation. The optical modulator 66 comprises the following three components: a polarizer 76a which is common to the three beams of the recording light L and which is provided the closer to the light source assembly 62; an analyzer 76b which is also common to the three beams of the recording light L but which is provided the closer to the photosensitive material A; and a modulating plate 78 which is provided between the polarizer 76a and the analyzer 76b and which has liquid-crystal cell arrays 78M, 78C and 78Y formed in association with the recording light $L_M$, $L_C$ and $L_Y$, respectively. Each of the liquid-crystal cell arrays 78M, 78C and 78Y is an array of multiple "liquid-crystal cells" comprising a liquid-crystal layer sealed between transparent electrodes and the respective liquid-crystal cells are controlled independently of one another (one electrode pair can be controlled independently of another). In the illustrated case, 512 channels of liquid-crystal cells are arranged.

The polarizer 76a, the modulating plate 78 and the analyzer 76b are shown separate in FIG. 3 for the sake of clarity but they are in fact stacked in a unitary assembly, which may optionally be held between glass plates to construct the optical modulator 66.

The direction of polarization of light that can be transmitted through the polarizer 76a differs by 90 degrees from the direction of light that can pass through the analyzer 76b.

In the absence of voltage application across the liquid-crystal layer in each of the liquid-crystal cells in the liquid-crystal cell arrays 78M, 78C and 78Y, the recording light $L_M$, $L_C$ and $L_Y$ linearly polarized by the polarizer 76a will simply pass through the liquid crystal layers to be blocked by the analyzer 76b. However, when the transparent electrodes in each liquid-crystal cell applies voltage across the liquid-crystal layer, the direction of orientation of liquid crystal molecules changes to alter the direction of polarization of light transmission through the liquid-crystal layer. Therefore, by supplying the liquid crystal layer with a sufficient voltage to rotate the direction of polarization of the recording light $L_M$, $L_C$ and $L_Y$ through 90 degrees, the recording light L can be rendered to be passable through the analyzer 76b (hence, the optical modulator 66).

Thus, the optical modulator 66 is a liquid-crystal shutter array and when the transparent electrodes apply a specified voltage across the liquid-crystal layer in accordance with the image to be recorded (i.e., the scan image data), the recording light $L_M$, $L_C$ and $L_Y$ are accordingly blocked or transmitted through the optical modulator, thereby effecting pulse-width (or pulse-numbers) modulation. Alternatively, the angle of rotation of the direction of polarization may be adjusted to control the intensity of transmission of the recording light $L_M$, $L_C$ and $L_Y$, thereby achieving intensity (pulse-amplitude) modulation.

In the printer 14 of the recording apparatus 10 of the invention, the developing device 24 contains a colorimetric analyzer 26 for performing measurements on the image (patches) recorded on the image-receiving material C. The exposing device 20 includes a correction LUT 28 which is set in accordance with the result of measurement with the colorimetric analyzer 26 so as to correct the scan image data, as well as a LUT setting section 30 which constructs and sets the correction LUT 28. As shown in FIG. 1, the scan image data is supplied from the CMS 18, corrected by the correction LUT 28 and thereafter supplied to the optical modulator 66.

In the printer 14, not only the image of the scan image data recorded in the image region but also patches with various densities including monochromatic colors, secondary colors and gray for constructing the correction LUT 28 are recorded outside the image (page) region which is associated with the scan image data for the hard copy to be finally obtained; hence, the exposing unit 34 will perform the corresponding exposure of the photosensitive material A. This point will be described more specifically hereinafter.

The liquid-crystal cell arrays 78M, 78C and 78Y in the illustrated optical modulator 66 each have 512 channels of independent liquid-crystal cells; briefly, the optical modulator 66 is a liquid-crystal shutter array having 512 (512 channels of) liquid-crystal shutters arranged in correspondence with each of the recording lights $L_M$, $L_C$ and $L_Y$. Therefore, beams of the recording light L incident on the optical modulator 66 pass through it to yield 512 independent beams of the recording light L ($L_1$–$L_{512}$) as modulated independently by the liquid-crystal cells in the liquid-crystal cell arrays 78M, 78C and 78Y.

Thus, in the exposing unit 34, the photosensitive material A can be exposed with 512 scan line drawings being formed simultaneously for each of the colors M, C and Y by 512 beams for each of the recording lights $L_M$, $L_C$ and $L_Y$; if one channel corresponds to the image recording of one pixel, image recording can be accomplished for 512 pixels at a time to realize very fast color image recording. For example, compared to electrophotography which records a color image by a single beam of recording light, the speed of color image recording by the invention is 1576 (3×512) times as fast and compared to the use of three beams of recording light in association with three primary colors, the speed is 512 times as fast.

The number of channels in the recording apparatus 10 of the invention is by no means limited to 512 in the illustrated case and a suitable channel number may be determined as appropriate for such factors as the performance required by the apparatus 10; in order to perform high-speed recording of high-resolution images, the use of about 16–512 channels is preferred, with about 32–256 channels being more preferred.

The liquid crystal that can be used in the liquid-crystal cells is also not limited to any particular type and known liquid crystals for use in optical shutters such as nematic, cholesteric, as well as ferroelectric liquid crystals (FLC) including smectic (A or C) liquid crystals may be employed. From the viewpoint of response speed and ease in control, smectic liquid crystals which are ferroelectric liquid crystals (FLC) are preferred, among which smectic A liquid crystals (which are used as the smectic A phase) are the most preferred.

Besides the liquid-crystal shutter, spatial modulating devices using electro-optic materials having an electro-optic effect as exemplified by $LiNbO_3$ compounds, PLZT, $LiTaO_3$ compounds and semiconductor materials may also be employed as the optical modulator 66.

The optical modulator 66 which is a spatial modulating device using liquid crystals or electro-optic materials is subject to the effect of temperature in aspects of response speed and transmittance. If smectic A liquid crystals (FLC) are to be used, the smectic A phase must be maintained by heating and holding the liquid crystal at a specified temperature and, what is more, they suffer from great variations in characteristics due to temperature. Under the circumstances, the optical modulator 66 has preferably temperature adjusting means for keeping the temperature within a specified range and depending on the temperature dependence of the characteristics of the spatial modulating device, temperature adjustment is preferably effected within specified limits of about ±1° C., more preferably within an error range of about ±0.1° C.

The recording light $L_M$, $L_C$ and $L_Y$ modulated with the optical modulator 66 pass through the imaging optics 68 comprising imaging lenses 68a and 68b, whereby they are focused on the photosensitive material A held on the exposing drum 36.

As already mentioned, the exposing drum 36 revolves in the direction of arrow a to effect main scanning whereas the exposing unit 34 having the exposing optics shown in FIG. 3 is driven by the carriage 58 to move at a specified speed (for example, at such a speed that when the exposing drum 36 has revolved fully once, the recording light $L_M$, $L_C$ and $L_Y$ for the first channel in the next cycle will fall adjacent to and downstream in the direction of arrow b of the scan line drawings formed of the recording light $L_M$, $L_C$ and $L_Y$ for the 512nd channel in the previous cycle at specified spacings associated with a specified resolution), whereupon the photosensitive material A is subjected to two-dimensional and blanket exposure to the recording light $L_M$, $L_C$ and $L_Y$.

In the illustrated optics 61, the shapes and intervals of the spots formed of the recording light $L_M$, $L_C$ and $L_Y$ which are focused on the photosensitive material A can be set at any desired values by adjusting various factors such as the magnifying power of the imaging optics 68 and the state of focusing it achieves. In other words, the resolution (recording density) can be selected and adjusted easily.

With the recording apparatus 10 of the invention, the method of exposing the photosensitive material A is not limited to the use of the illustrated optical modulator 66 which is a spatial modulating device employing liquid-crystal shutter arrays. Other applicable methods are multi-channel exposure using LED arrays and multi-channel exposure using multiple light beams. The exposing device 20 of the illustrated type which rotates the exposing drum 36 and performs multi-channel exposure utilizing the spatial modulating device as the optical modulator 66 is particularly preferred since by selecting the size of the exposing drum 76, the exposing device 20 can be easily adapted to the image recording of large sizes such as A1 compared to the method of exposure by deflection scanning using an optical deflector and, in addition, it can be easily adapted to the use of an increased number of channels.

When the scan exposure of the photosensitive material A ends after the procedure described above, the material is sent to the ejecting section 38, where it is separated from the exposing drum 36 and thence ejected into the buffer unit 22. The ejecting section 38 comprises a strip finger 80, a strip roller 82, transport roller pairs 84 and 86, a shutter 88, a transport guide, etc.

When the scan exposure of the photosensitive material A ends, the exposing drum 36 stops rotating in the direction of arrow a and starts to rotate in reverse direction, whereupon the strip finger 80 comes into contact with the exposing drum. As a result, the strip finger 80 is inserted between the rear end of the photosensitive material A and the exposing drum 36 and the combined action of the strip finger 80 and the strip roller 82 causes the photosensitive material A to separate from the exposing drum 36 and the separated photosensitive material A is ejected into the buffer unit 22 by means of the transport roller pairs 84 and 86. It should be noted that the shutter 88 is normally closed to isolate the exposing device 20 from the buffer unit 22 and as the photosensitive material A is transported by means of the transport roller pairs 84 and 86, the shutter 88 is opened but again closed at the point of time when the photosensitive material A is completely accommodated within the buffer unit 22.

Indicated by 90 in FIG. 3 is the top cover of the exposing device 20. The top cover is normally closed but opened to provide for access to the interior of the exposing device 20 when necessary as in the case of jamming or during maintenance.

As already mentioned, the exposing device 20 is connected to the developing device 24 via the buffer unit 22. The buffer unit 22 is a housing having transport roller pairs 92 and 94 provided in the upper part and accommodates the photosensitive material A by forming a slack portion (loop) between the two transport roller pairs.

The recording apparatus 10 is capable of outputting hard copies of not only small sizes but also larger sizes up to A1. However, the speed at which the photosensitive material A is ejected from the exposing device 20 differs from the speed at which the photosensitive material A is transported into the developing device 24 (i.e., the speed at which the photosensitive material A is brought into a superposed relationship with the image-receiving material C which is described just below). In addition, the exposing time is not the same as the developing time and, hence, the end of exposure in the exposing device 10 is not synchronous with the end of thermal development in the developing device 24.

Under the circumstances, the buffer unit 22 is provided for temporary storage of the photosensitive material A so that the exposing device 20 can be operated independently of the developing device 24 to ensure that each device performs to the maximum capacity of its own, thereby outputting hard copies in an efficient manner. It should also be mentioned that not only the developing device 24 which performs thermal development but also the exposing device 20 involves heat generation (although slight in the exposing device 20); however, the provision of the buffer unit 22 between the two devices eliminates any adverse effects which one unit may have on the other during exposure and development and this enables images of high quality to be recorded in a consistent manner.

The photosensitive material A is sent from the buffer unit 22 into the developing device 24. The developing device 24 basically comprises a water applicator section 96, an image-receiving material supply section 98, a thermal development/transfer section 100, an ejecting section 102, etc. The exposed photosensitive material A is coated with water as an image forming solvent, placed in a superposed relationship with the image-receiving material C, subjected to thermal development and transfer, and separated from the image-receiving material C now carrying the transferred image. The image-receiving material C is output as a hard copy and the spent photosensitive material A is ejected.

The photosensitive material A ejected from the buffer unit 22 is transported by a transport roller pair 104 in the water applicator section 96 as it is coated with a specified volume of water in an application tank 106, from which it is transported into the thermal development/transfer section 100. Although not shown, the application tank 106 contains squeeze rollers and other components to adjust the volume of water to be coated on the photosensitive material A.

In the image-receiving material supply section 98, the image-receiving material C is wound in a roll which is contained in an image-receiving material magazine 108 which, in turn, is loaded in the image-receiving material supply section 98. In addition to the area for loading the image-receiving material magazine 108, the image-receiving material supply section 98 has a withdrawing roller pair 110, a cutter 112, and transport roller pairs 114, 116, 118 and 120.

In the image-receiving material supply section 98, in response to an instruction such as one from the aforementioned control unit 12, the withdrawing roller pair 110 draws the image-receiving material C out of the magazine 108 as it is transported by the transport roller pairs 114, 116, 118 and 120. The transport of the image-receiving material C by means of the transport roller pairs 116, 118 and 120 ends when the advancing end of the material C has reached a point a specified distance downstream of the transport roller pair 120. On the other hand, the drawing out of the image-receiving material C by means of the withdrawing roller pair 110 and its transport by means of the transport roller pair 114 continues until the length of the material C being drawn out becomes equal to a specified value associated with the size of the photosensitive material A, namely, the size of the hard copy to be created. Therefore, a loop of the image-receiving material C is formed between the transport roller pairs 114 and 116.

When the specified length of the image-receiving material C has been drawn out, the withdrawing roller pair 110 and the transport roller pair 114 stop and the cutter 112 turns on to cut the image-receiving material C. The image-receiving material supply section 98 then stands by until the advancing end of the photosensitive material A has reached a specified position in the water applicator section 96. The image-receiving material C is cut to a length slighter shorter than the photosensitive material A in the direction of transport.

When the advancing end of the photosensitive material A reaches the specified position, the transport roller pairs 114, 116, 118 and 120 are driven synchronously to start the transport of the image-receiving material C, whereupon the water-coated photosensitive material is brought into a superposed relationship with the image-receiving material C by means of a superposing roller 122 and the combination is transferred to the thermal development/transfer section 100. As already mentioned, the image-receiving material C is a little shorter than the photosensitive material A, so the timing of the start of transport of the image-receiving material C by means of the transport roller pair 120 and the like is adjusted such that after superposition, the four corners of the photosensitive material A somewhat project beyond the image-receiving material C.

The thermal development/transfer section 100 comprises a cylindrical heating drum 124 revolving at a specified speed, rollers 126a, 126b, 126c and 126d, a photosensitive material stripping roller 128, an endless belt 130 stretched between the five rollers to be urged against the outer circumference of the heating drum 124, and an image-receiving material stripping roller 132. A halogen lamp (not shown) is provided as heating means within the heating drum 124 so that its surface is heated to a specified temperature.

The combination of the photosensitive material A and the image-receiving material C which have been brought into a superposed relationship by means of the superposing roller 122 is inserted between the heating drum 124 and the endless belt 130 and transported as they are held therebetween for heating with the heating drum 124.

As a result, the photosensitive material A is developed to release the mobile dye, which is simultaneously transferred on to the dye fixing layer in the image-receiving material C, thereby forming a visible image on the image-receiving surface of the material C. Hence, the speed at which the heating drum 124 rotates (i.e., transport speed) is set and adjusted such that the period of time for which the combination of the two materials A and C is transported as it is held between the heating drum 124 and the endless belt 130 is suitable for thermal development and transfer. Alternatively, development and transfer may be effected after stopping the transfer of the combination of the two materials A and C at the point of time when it is completely encased in the space between the heating drum 124 and the endless belt 130.

As already mentioned, the four corners of the photosensitive material A in a superposed relationship with the image-receiving material C project beyond the latter. Therefore, when the advancing end of the photosensitive material A has reached the stripping roller 128, only the advancing end of the photosensitive material A is detached by a strip finger or the like (not shown) so that the material A is separated from the image-receiving material C by means of the stripping roller 128 and transported to the ejecting section 102, from which it is ejected to the outside of the apparatus for disposal. If desired, a tray for receiving the spent photosensitive material A may be built in the apparatus so that the photosensitive material A is transported to the tray.

Referring to the image-receiving material C now carrying the transferred image, when its advancing end has reached the stripping roller 132, the advancing end is similarly detached from the heating drum 12 by means of a strip finger or the like (not shown) so that the material C is separated from the drum 12 and ejected into a pickup tray 134 in the ejecting section 102, whereby a hard copy is output.

As shown in FIG. 2, the calorimetric analyzer 26 is provided in the transport path of the image-receiving material C from the stripping roller 132 to the pickup tray 134. The exposing device 20 also contains the correction LUT 28 for correcting the scan image data and the LUT setting section 30 for constructing and setting the correction LUT 28.

As already mentioned, the recording apparatus 10 (printer 14) forms not only the image of the scan image data within the image region for the hard copy (image-receiving material C) but also patches of various densities including monochromatic colors (e.g., C, M, Y, R, G and B), secondary colors, tertiary colors and gray outside the image region. While the image-receiving material C is being transported to the pickup tray 134, the calorimetric analyzer 26 measures the colors/densities of the patches and send the results of measurements to the LUT setting section 30.

In accordance with the results of measurements, the LUT setting section 30 constructs and sets the correction LUT 28 for correcting the scan image data. Stated more specifically, the LUT setting section 30 has a storage of the appropriate patch densities relevant to the scan image data from which the above-mentioned patches have been recorded. On the basis of these appropriate patch densities and the patch densities actually measured with the calorimetric analyzer 26, matrix operations and other calculations are performed to construct a LUT which performs scan image data correction such that the color/densities of the image on the hard copy being output from the printer 14 will be appropriate in conformity with the scan image data supplied from the control unit 12 (CMS 18). The thus constructed LUT is set as the correction LUT 28.

The scan image data supplied from the control unit 12 is corrected by the LUT 28 and thereafter fed into the optical modulator 66, which accordingly modulates the recording light $L_M$, $L_C$ and $L_Y$. In other words, the LUT setting section 30 is a site for performing "calibration"

Having the capabilities described above, the recording apparatus 10 of the invention features excellent color stabilization and reproduction and hence is capable of outputting hard copies by operating consistently at all times.

The correction LUT 28 may be rewritten at any one output of a hard copy; alternatively, it may be adapted to be rewritten at specified intervals such as 10 or 50 hard copy outputs. The correction LUT 28 may also be rewritten as need arises such as when the product lot of photosensitive material A or image-receiving material C has changed or in response to an operator's instruction. Alternatively, the correction LUT 28 may be omitted and the LUT in the CMS 18 may instead be adapted to be rewritable; if desired, the correction LUT may be incorporated in the CMS 18.

In addition to the capabilities described above, the recording apparatus 10 of the invention may of course be adapted to control various operating conditions (e.g., the temperature of the heating drum 124, the time of thermal development, the temperature of water in the water applicator section 96, the volume of water to be applied and the temperature during exposure) by known means in order to realize satisfactory color stabilization and reproduction through the stabilization of the apparatus.

If the product lot of photosensitive material A or image-receiving material C changes, the CMS 18 or the correction LUT 28 may be altered or adjusted in accordance with the new photosensitive material A or image-receiving material C; or a correction LUT corresponding to the product lot of the corresponding photosensitive material A may be set to ensure more satisfactory color stabilization and reproduction.

While the color image recording apparatus of the invention has been described above in detail, this is not the sole case of the invention and various changes and modifications may of course be made without departing from the scope and spirit of the invention. For example, in addition to the case of applying the color image recording apparatus of the invention to a proof creating system in the art of making printing plates, the concept of the invention may also be utilized with advantage in various other color image recording apparatus including digital color copiers and digital color printers.

As described above in detail, the color image recording apparatus of the invention ensures that hard copies having print-quality images and a high degree of similarity to the actual print can be output consistently with satisfactory color stabilization and reproduction. Further, the apparatus is capable of outputting hard copies of large sizes up to A1 at high speed with high efficiency.

What is claimed is:

1. A color image recording apparatus with which one page of image created by assignment of at least one of graphics, characters and line drawings is reproduced in hard copy using a photosensitive material, which apparatus comprises:

a raster image processor with which said image described in a computer language is expressed in bit maps to create scan image data;

color management means by which a color/density of the scan image data generated with said raster image processor are corrected in accordance with conditions for the reproduction of said image by the user of said hard copy;

an exposing device with which the photosensitive material is scan exposed by multi-channel exposure to record a latent image in accordance with the scan image data corrected by said color management means;

a developing device with which the photosensitive material having the latent image formed thereon by said exposing device is subjected to a development process so as to create a hard copy having said image reproduced thereon;

an instrument which is provided in said developing device to measure the color/density of the image in said hard copy; and means for revising a conditions of exposure in said exposing device and/or the conditions of correction in said color management means in accordance with a result of measurement with said instrument.

2. The color image recording apparatus according to claim 1, wherein said photosensitive material is a silver halide photosensitive material which requires thermal development and brought into a superposed relationship with an image-receiving material such that an image is transferred on to said image-receiving material to produce a hard copy which has said image reproduced thereon.

3. The color image recording apparatus according to claim 1, wherein said computer language is a page description language.

4. The color image recording apparatus according to claim 1, wherein said color management means is a lookup table.

5. The color image recording apparatus according to claim 1, further comprising a buffer unit provided for temporary storage of the photosensitive material between the exposing device and the developing device so that the exposing device can be operated independently of the developing device.

6. The color image recording apparatus according to claim 1, wherein patches of different densities including colors and gray are formed outside of an image region for the hard copy as well as the image is reproduced in the image region, and the color/densities of said patches are measured by said instrument to revise the conditions of exposure in the exposing device and/or the conditions of correction in the color managing means by means of said revising means.

7. The color image recording apparatus according to claim 1, wherein said exposing device comprises an exposing drum holding the photosensitive material on its outer circumference and being rotated to perform main scanning, an exposing unit issuing a plurality of light beams to the photosensitive material wound onto the outer circumference of the exposing drum to perform the multi-channel exposure of the photosensitive material, a carriage moving the exposing unit in a direction parallel to a rotating axis of the exposing drum to perform auxiliary scanning, means for rotating the exposing drum, and means for holding and securing the photosensitive material on the outer circumference of the exposing drum by suction.

8. The color image recording apparatus according to claim 7, wherein said exposing unit comprises a light source assembly containing three light sources which issue three recording lights for recording a color image on the photosensitive material, shaping optics shaping the three recording lights issuing from the three light sources into generally parallel recording lights spread laterally, an optical modulator yielding a plurality of independent beams of each of the three recording lights as modulated independently, and imaging optics focusing a plurality of modulated independent beams of each of the three recording lights on the photosensitive material held on the outer circumference of the exposing drum.

9. The color image recording apparatus according to claim 8, wherein said optical modulator is a spatial modulating device which turns on and off the plurality of independent beams of each of the three recording lights in accordance with the scan image data sent from the color management means, thereby effecting pulse-width modulation or pulse-numbers modulation.

10. The color image recording apparatus according to claim 8, wherein said optical modulator is a liquid-crystal shutter array to achieve pulse-width or pulse-numbers or pulse-amplitude modulation.

11. The color image recording apparatus according to claim 8, wherein said optical modulator comprises a polarizer being common to the three recording lights and provided on the side of the light source assembly, an analyzer being common to the three recording lights and provided on the side of the photosensitive material, and a modulating plate provided between the polarizer and the analyzer and having three liquid-crystal cell arrays formed in accordance with the three recording lights, respectively.

12. The color image recording apparatus according to claim 11, wherein each of said three liquid-crystal cell arrays is an array of multiple liquid-crystal cells comprising a liquid-crystal layer sealed between transparent electrodes and the respective liquid-crystal cells are controlled independently of one another by each electrode pair.

13. The color image recording apparatus according to claim 12, wherein a liquid crystal used in said liquid-crystal cells is a ferroelectric liquid crystal.

14. The color image recording apparatus according to claim 13, wherein said ferroelectric liquid crystal is a smectic A liquid crystal.

15. The color image recording apparatus according to claim 8, wherein said optical modulator has temperature adjusting means for keeping temperature within a specified range.

16. The color image recording apparatus according to claim 15, wherein said temperature adjusting means keeps the temperature within an error range of $\pm 1°$ C.

* * * * *